(12) United States Patent
Jang (10) Patent No.: US 7,894,686 B2
(45) Date of Patent: Feb. 22, 2011

(54) ADAPTIVE VIDEO ENHANCEMENT GAIN CONTROL

(75) Inventor: Eric Jang, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 884 days.

(21) Appl. No.: 11/326,073

(22) Filed: Jan. 5, 2006

(65) Prior Publication Data

US 2007/0154107 A1 Jul. 5, 2007

(51) Int. Cl.
G06K 9/40 (2006.01)

(52) U.S. Cl. .................... 382/274; 382/168; 382/263; 382/264; 382/266; 348/627; 348/463; 348/255; 358/527; 358/500; 358/522; 358/1.9

(58) Field of Classification Search ............... 382/261, 382/274, 168, 263–264, 266; 348/627, 463, 348/255; 358/527, 500, 522, 1.9
See application file for complete search history.

(56) References Cited

U.S. PATENT DOCUMENTS

| 4,814,862 | A | * | 3/1989 | Travert ................. 348/668 |
| 5,278,641 | A | * | 1/1994 | Sekizawa et al. ........ 358/527 |
| 5,406,391 | A | * | 4/1995 | Takahashi ............. 358/482 |
| 5,563,962 | A | * | 10/1996 | Peters et al. ............ 382/261 |
| 5,614,948 | A | * | 3/1997 | Hannah ................. 348/255 |
| 5,805,313 | A | * | 9/1998 | Hayashi et al. .......... 358/518 |
| 6,101,294 | A | * | 8/2000 | McCaffrey et al. ...... 382/312 |
| 6,154,288 | A | * | 11/2000 | Watanabe .............. 358/1.9 |
| 6,462,735 | B2 | * | 10/2002 | Naito ................... 345/204 |
| 6,700,626 | B2 | | 3/2004 | Stessen et al. |
| 6,741,736 | B1 | * | 5/2004 | Jaspers ................. 382/169 |
| 7,199,840 | B2 | * | 4/2007 | Shiota ................. 348/678 |
| 7,321,699 | B2 | * | 1/2008 | Johnson et al. .......... 382/254 |
| 7,466,301 | B2 | * | 12/2008 | Sohn et al. ............. 345/102 |
| 2001/0052945 | A1 | * | 12/2001 | Stessen ................. 348/672 |
| 2002/0027618 | A1 | * | 3/2002 | Stessen et al. ........... 348/625 |
| 2002/0126139 | A1 | * | 9/2002 | Kuriyama et al. ........ 345/690 |
| 2002/0171663 | A1 | * | 11/2002 | Kobayashi et al. ....... 345/600 |
| 2004/0001165 | A1 | * | 1/2004 | Shiota et al. ............ 348/678 |
| 2004/0086168 | A1 | * | 5/2004 | Kuwabara .............. 382/145 |
| 2004/0131273 | A1 | * | 7/2004 | Johnson et al. .......... 382/254 |
| 2005/0129110 | A1 | * | 6/2005 | Marquant et al. ...... 375/240.03 |
| 2005/0281460 | A1 | * | 12/2005 | Wilt ..................... 382/168 |
| 2006/0204123 | A1 | * | 9/2006 | Kempf et al. ............ 382/263 |
| 2006/0247877 | A1 | * | 11/2006 | Bala et al. ............. 702/107 |
| 2006/0269129 | A1 | * | 11/2006 | Tanigawa ............. 382/169 |
| 2008/0252791 | A1 | * | 10/2008 | Mitsunaga ............. 348/673 |

OTHER PUBLICATIONS

Li et al., "Real-time image histogram equalization using FPGA", Proc. SPIE, vol. 3561, 293 (1998), p. 293-298.*

(Continued)

Primary Examiner—Brian Q Le
Assistant Examiner—Mekonen Bekele
(74) Attorney, Agent, or Firm—Christopher P. Maiorana, PC (57) ABSTRACT

An apparatus comprising a first circuit and a second circuit. The first circuit may be configured to determine frequency of occurrence information for a range of gray levels from luminance data of an input signal. The second circuit may be configured to selectively adjust enhancement for at least one portion of the range of grey levels based upon the frequency of occurrence information.

23 Claims, 10 Drawing Sheets

OTHER PUBLICATIONS

Hentschel and La Hei: "Effective Peaking Filter and Its Implementation on a Programmable Architecture" IEEE Transactions on Consumer Electronics, vol. 47, No. 1, Feb. 2001, p. 33-39.*

R. W. Ehrich "A Symmetric Hysteresis Smoothing Algorithm that Preserves Principal Features", Comiputer Graphics and Image Procfssing, 1978, pp. 121-126.*

* cited by examiner

ADAPTIVE VIDEO ENHANCEMENT GAIN CONTROL

FIELD OF THE INVENTION

The present invention relates to image and video processing generally and, more particularly, to a method and/or apparatus for adaptive video enhancement gain control.

BACKGROUND OF THE INVENTION

Video enhancement techniques are used to make video appear sharper. One type of video enhancement technique involves enhancing edges or high frequency elements of the video. Conventional edge enhancement uses a high pass filter (HPF) or band pass filter (BPF) and an adder with filtering gain control. The conventional technique for enhancing edges is based on the Mach band effect. Edge enhancement is achieved by increasing the simultaneous contrast of the edge. The variation of the simultaneous contrast needs to be clamped into a limited range to avoid undershoot or overshoot (i.e., for an 8 bit unsigned quantization system, the limits are 0 and 255).

Figure 1:
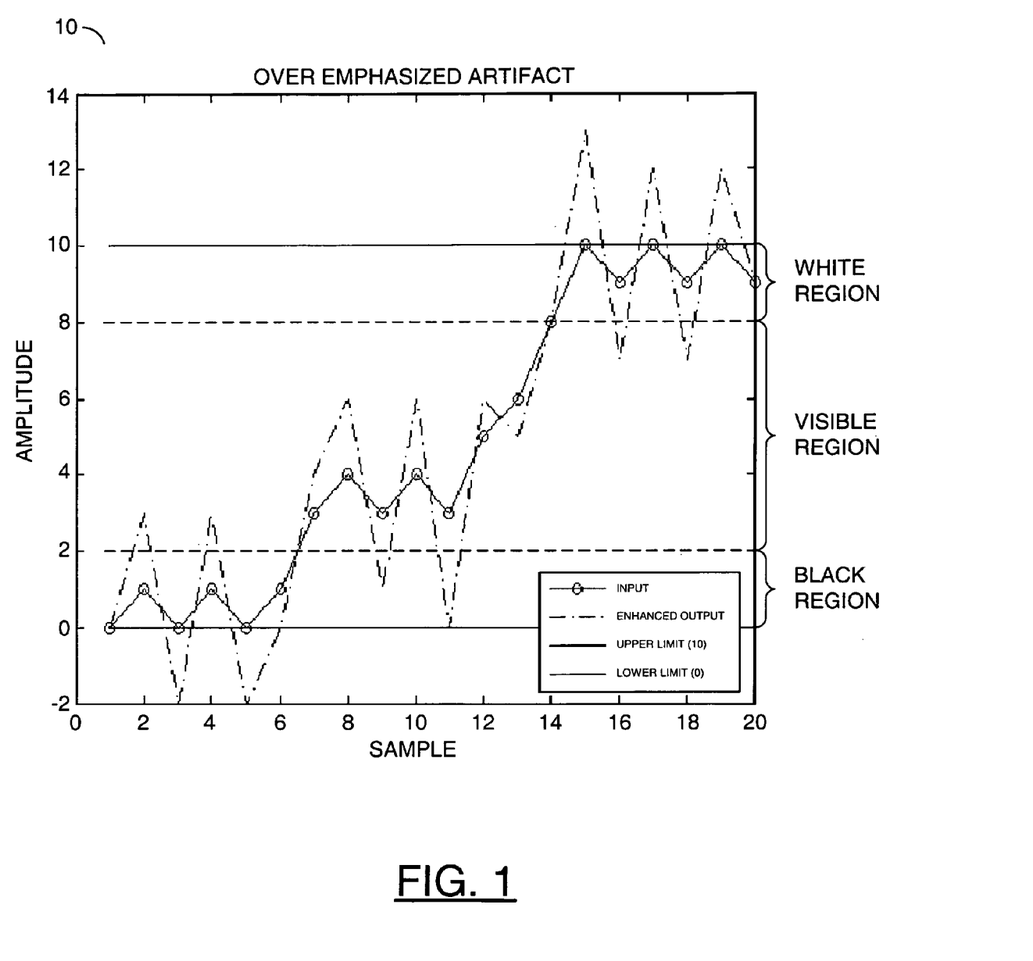
FIG. 1 is a graph illustrating an example of an enhanced version of an input signal obtained using a conventional edge enhancement technique.

Referring to FIG. 1, a graph 10 is shown illustrating an example of over emphasized artifacts that can occur with the conventional enhancement technique. An input signal, captured from a monochrome image with a quantization range of zero to ten, can have a black region having a range from zero to less than two, a visible (or perceivable) region having a range from two to eight and a white region having a range from greater than eight to ten. From a perceptual view, the pixels located in the black region or the white region are not distinguishable.

An enhanced output signal (i.e., mixed original and a gain controlled output of a HPF or BPF) can have overshoot and undershoot conditions (i.e., pixel values greater than 10 or less than 0, respectively). The overshoot and undershoot conditions can be corrected by clamping circuitry. However, some pixels that were in the black region or the white region in the input signal (i.e., pixels 2, 4, 16 and 18) can be shifted into the visible region (i.e., the range from two to eight) after enhancement. The pixels with values shifted into the visible range cause artifacts (i.e., noise in the black and white regions). In general terms, the enhancement can cause white flakes in the black region and grey flakes in the white region.

To reduce the over emphasized artifacts a filtering gain control scheme is used. However, the artifacts will be highlighted if the gain control is not set properly. Unfortunately, a proper setting of the filtering gain is very difficult because the HPF or the BPF operates based on the frequency component of the video and ignores the amplitude component of the video.

Figure 2A:
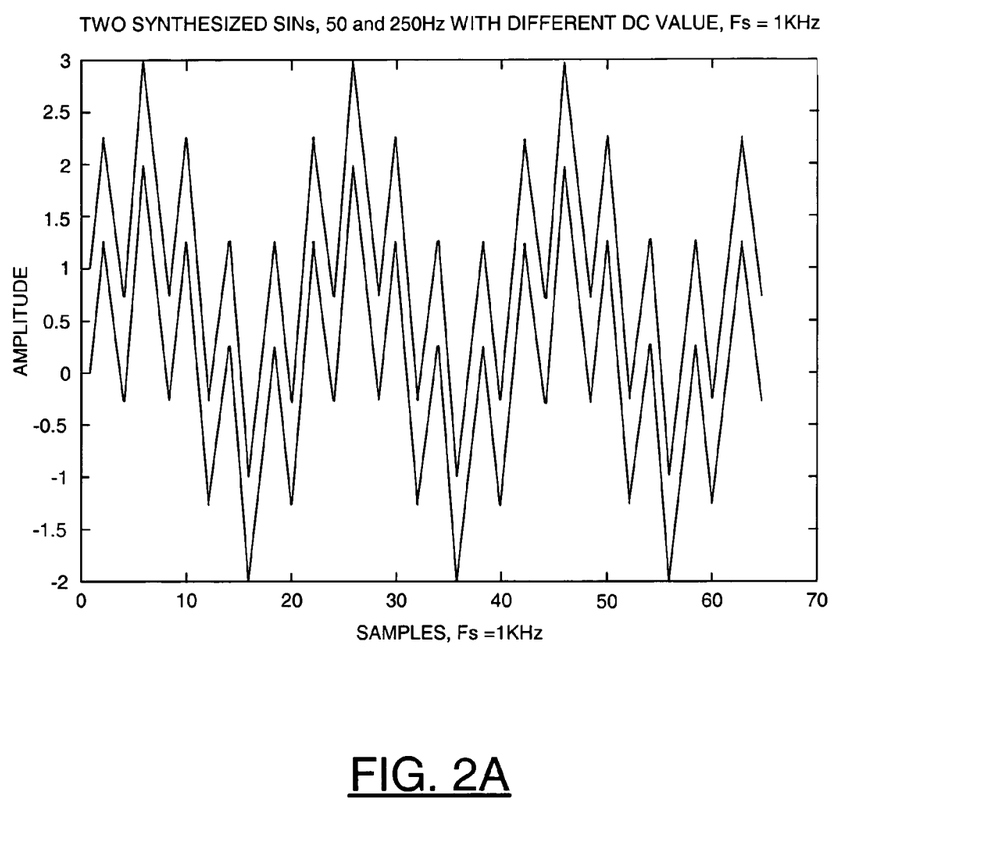
Figure 2B:
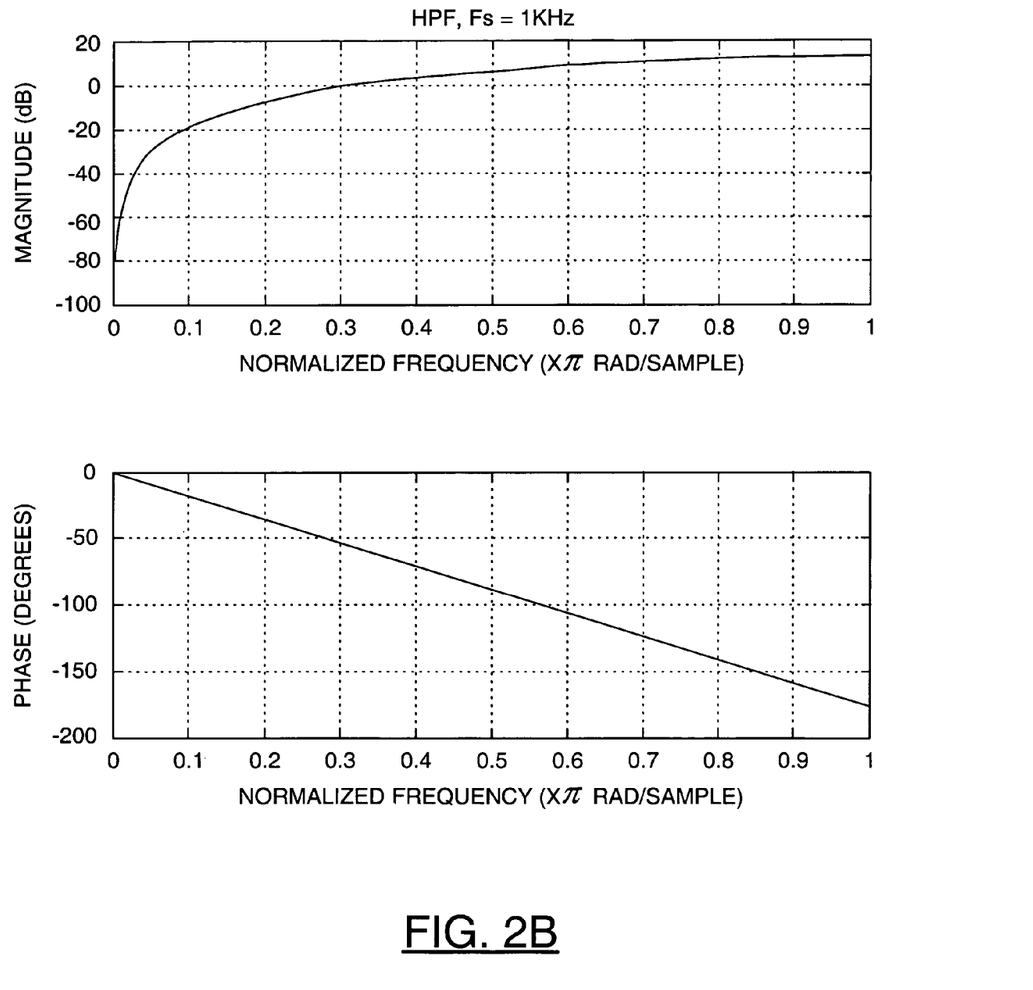
Figure 2C:
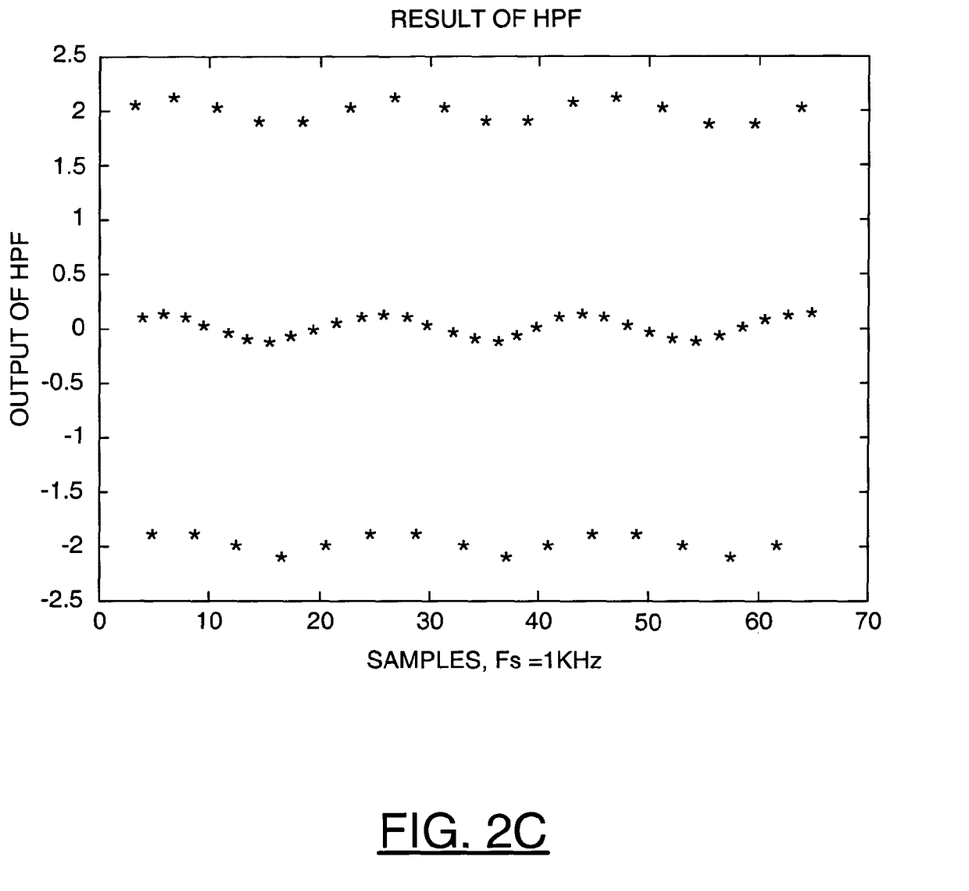

Referring to FIGS. 2(A-C), graphs are shown illustrating characteristics of a high pass filter. Input signals presented to a high pass filter can have different DC (direct current) values (illustrated in FIG. 2A). However, the output of the high pass filter is related to frequency response and phase relationship and independent of the DC value of the input (as illustrated in FIG. 2B). The outputs of the high pass filter can be identical for the input signals with different DC values (FIG. 2C).

The conventional techniques have disadvantages of emphasizing pixels that human vision can not distinguish and causing artifacts. The filtering gain adjustment is based on frequency domain response (filter output) only and ignores the time domain characteristic of the input signal (i.e., the DC value).

It would be desirable to have a method and/or apparatus for adaptively controlling the filtering gain to avoid artifacts.

SUMMARY OF THE INVENTION

The present invention concerns an apparatus comprising a first circuit and a second circuit. The first circuit may be configured to determine frequency of occurrence information for a range of gray levels from luminance data of an input signal. The second circuit may be configured to selectively adjust enhancement for at least one portion of the range of grey levels based upon the frequency of occurrence information.

The objects, features and advantages of the present invention include providing a method and/or apparatus for adaptive video enhancement gain control that may (i) provide a filtering gain that emphasizes only pixels in a perceptual luminance range (PLR), (ii) reduce over emphasized artifacts, (iii) implement a perceptual luminance range histogram (PLRH), (iv) use the PLRH to provide an energy distribution of the perceptual luminance range, (v) set reference limits to avoid artifacts, (vi) implement a hysteretic filter to reduce artifacts caused by abrupt histogram change, (vii) adaptively control filtering gain to achieve a sharper result for different applications, (viii) provide a Gaussian curve gain distribution built into a look-up table (LUT), (ix) achieve luminance equalization adaptively and without causing color distortion, and/or (x) achieve a variable peaking gain by simply modifying the shape of the Gaussian curve in the LUT.

BRIEF DESCRIPTION OF THE DRAWINGS

These and other objects, features and advantages of the present invention will be apparent from the following detailed description and the appended claims and drawings in which:

FIGS. 2(A-C) are graphs illustrating high pass filter characteristics;

FIGS. 10(A-B) are histograms illustrating an example of dynamic contrast in accordance with a preferred embodiment of the present invention.

DETAILED DESCRIPTION OF THE PREFERRED EMBODIMENTS

The present invention generally focuses on a human visual aspect of edge enhancement. The present invention generally uses a perceptual luminance range (PLR) instead of a whole quantized range to implement a PLR histogram (PLRH). For example, while the whole quantized range may be, in one example, from 0 to 255 (8-bit), the PLR may range, in one example, from about 64 to about 192. The PLR may be implemented with a range that may be adjusted (programmable). The PLRH is a histogram of the perceptual luminance range that generally provides an energy distribution of an image. Using the PLRH, a weight processor and hysteretic filter (WPHF) may be configured to assign a perceptual filtering gain based on a predetermined Gaussian curve gain distribution. In one example, the Gaussian curve gain distribution may be implemented in (built into) a look-up table (LUT). The LUT may be used to adaptively adjust the filtering gain.

Figure 3:
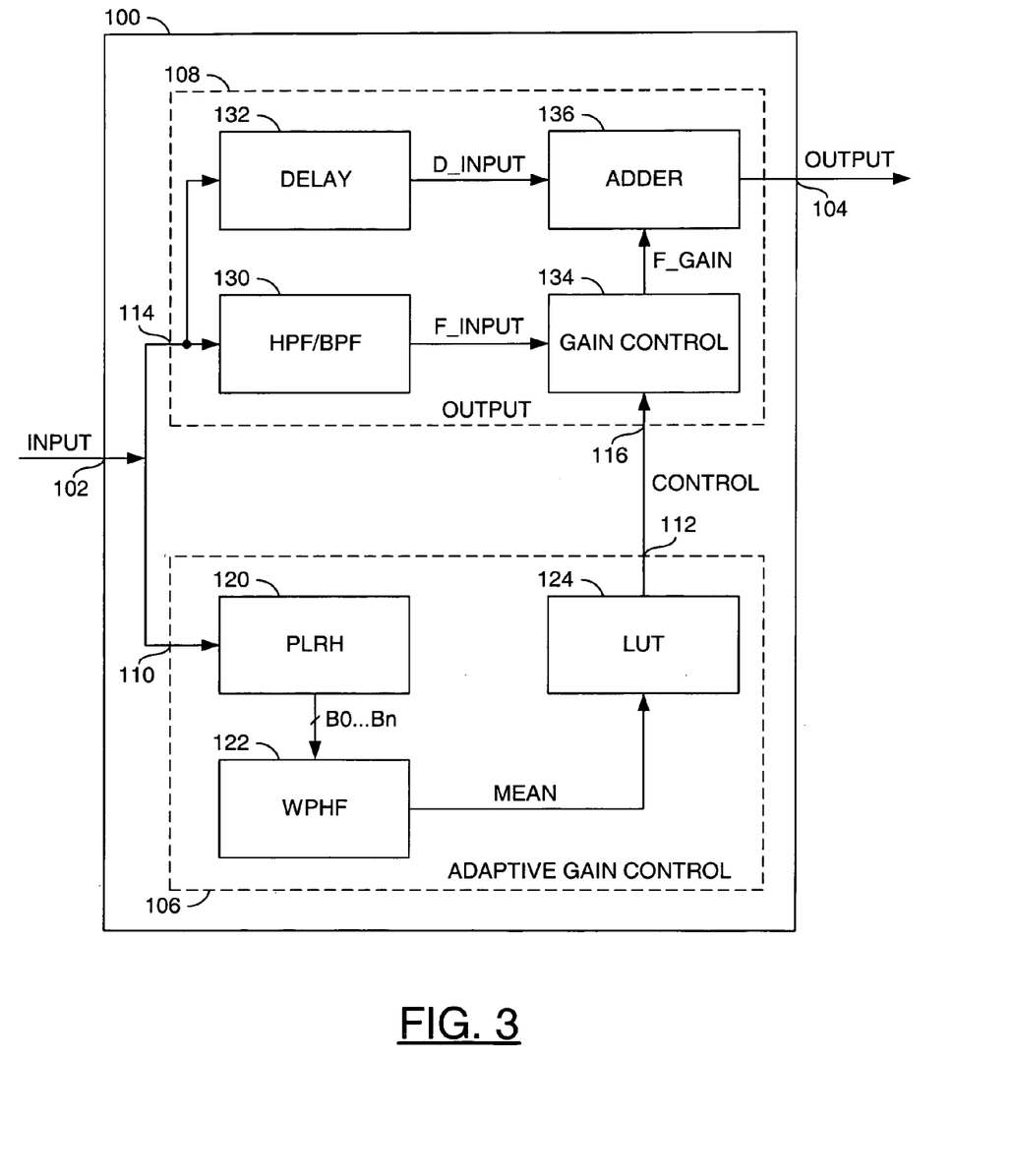
FIG. 3 is block diagram illustrating a circuit in accordance with a preferred embodiment of the present invention.

Referring to FIG. 3, a block diagram is shown illustrating a circuit 100 in accordance with a preferred embodiment of the present invention. In one example, the circuit 100 may be implemented as a video enhancement circuit (or block). The circuit 100 may have an input 102 that may receive a signal (e.g., INPUT) and an output 104 that may present a signal (e.g., OUTPUT). The signal INPUT may comprise a video signal. The signal OUTPUT may comprise an edge enhanced version of the signal INPUT. In one example, the signals INPUT and OUTPUT may comprise a luminance (Y) component of the respective video signals. The circuit 100 may be configured to generate the signal OUTPUT in response to the signal INPUT using adaptive gain control.

In one example, the circuit 100 may comprise a circuit (or block) 106 and a circuit (or block) 108. In one example, the circuit 106 may be implemented as an adaptive video enhancement gain control system. The circuit 108 may be implemented as a video enhancement output circuit. The circuit 106 may have an input 110 that may receive the signal INPUT and an output 112 that may present a signal (e.g., CONTROL). The signal CONTROL may be implemented as a control signal. The signal CONTROL may be configured to adaptively control a filtering gain of the circuit 108. The circuit 106 may be configured to generate the signal CONTROL in response to the signal INPUT. The circuit 108 may have an input 114 that may receive the signal INPUT, an input 116 that may receive the signal CONTROL and an output that may present the signal OUTPUT. The circuit 108 may be configured to generate the signal OUTPUT in response to the signals INPUT and CONTROL.

In one example, the circuit 106 may comprise a circuit (or block) 120, a circuit (or block) 122 and a circuit (or block) 124. The circuit 120 may be implemented, in one example, as a perceptual luminance range histogram (PLRH) generating circuit. The circuit 122 may be implemented, in one example, as a weight processor and hysteretic filter (WPHF) block. The circuit 124 may be implemented, in one example, as a look-up table (LUT). The circuit 120 may have an input that may receive the signal INPUT and an output that may present a number of signals (e.g., B0 . . . Bn). In one example, the signals B0 . . . Bn may represent individual bin (or slot) values of the perceptual luminance range histogram. The circuit 122 may have an input that may receive the signals B0 . . . Bn and an output that may present a signal (e.g., MEAN). The signal MEAN may be configured to indicate a center value or mean of a distribution curve for the values of the perceptual luminance range histogram. For a Gaussian curve (e.g., a normal distribution curve) the curve function may be expressed by Equation 1 below:

$$F(x) = 1/\sigma \times sqr(2\pi) \times (e^{-0.5((x-\mu)/\sigma)2})$$ Eq. 1 where the value $\mu$ represents the mean of x and the variable $\sigma$ represents the standard deviation of x.

The circuit 124 may have an input that may receive the signal MEAN and an output that may present the signal CONTROL. The circuit 124 may be configured to generate the signal CONTROL in response to the signal MEAN. In one example, the circuit 124 may contain entries representing samples of a predetermined distribution curve (e.g., a Gaussian curve). For example, the entries stored in the circuit 124 may be determined using Equation 1 above. In one example, the circuit 124 may be configured to set a center value of the distribution curve in response to the signal MEAN. In one example, the preloaded samples in the circuit 124 may be determined for a gain curve for a particular standard deviation (e.g., $\sigma i$). In another example, the preloaded samples may be determined for a number of different gain distribution curves for a number of different standard deviations (e.g., $\sigma 1$-$\sigma n$).

In one example, the circuit 108 may comprise a circuit (or block) 130, a circuit (or block) 132, a circuit (or block) 134 and a circuit (or block) 136. The circuit 130 may be implemented, in one example, as either a high pass filter (HPF) or a band pass filter (BPF). The circuit 132 may be implemented, in one example, as a delay circuit. The circuit 134 may be implemented, in one example, as a gain control circuit. The circuit 136 may be implemented, in one example, as an adder circuit.

The circuit 130 may have an input that may receive the signal INPUT and an output that may present a signal (e.g., F_INPUT) to a first input of the circuit 134. The circuit 134 may have a second input that may receive the signal CONTROL and an output that may present a signal (e.g., F_GAIN) to a first input of the circuit 136. The circuit 132 may have an input that may receive the signal INPUT and an output that may present a signal (e.g., D_INPUT) to a second input of the circuit 136. The circuit 136 may have an output that may present the signal OUTPUT. The circuits 130-136 may be implemented using conventional techniques.

The signal INPUT may be fed through a HPF/BPF (e.g., the circuit 130) and a delay device (e.g., the circuit 132) that is configured to compensate for a delay of the HPF/BPF. The signal F_INPUT may be used to select a multiplier for a gain of the circuit 134 to generate the signal F_GAIN. The signal F_GAIN may be summed with the signal D_INPUT by the circuit 136. An output of the circuit 136 may present the enhanced result as the signal OUTPUT.

Figure 4:
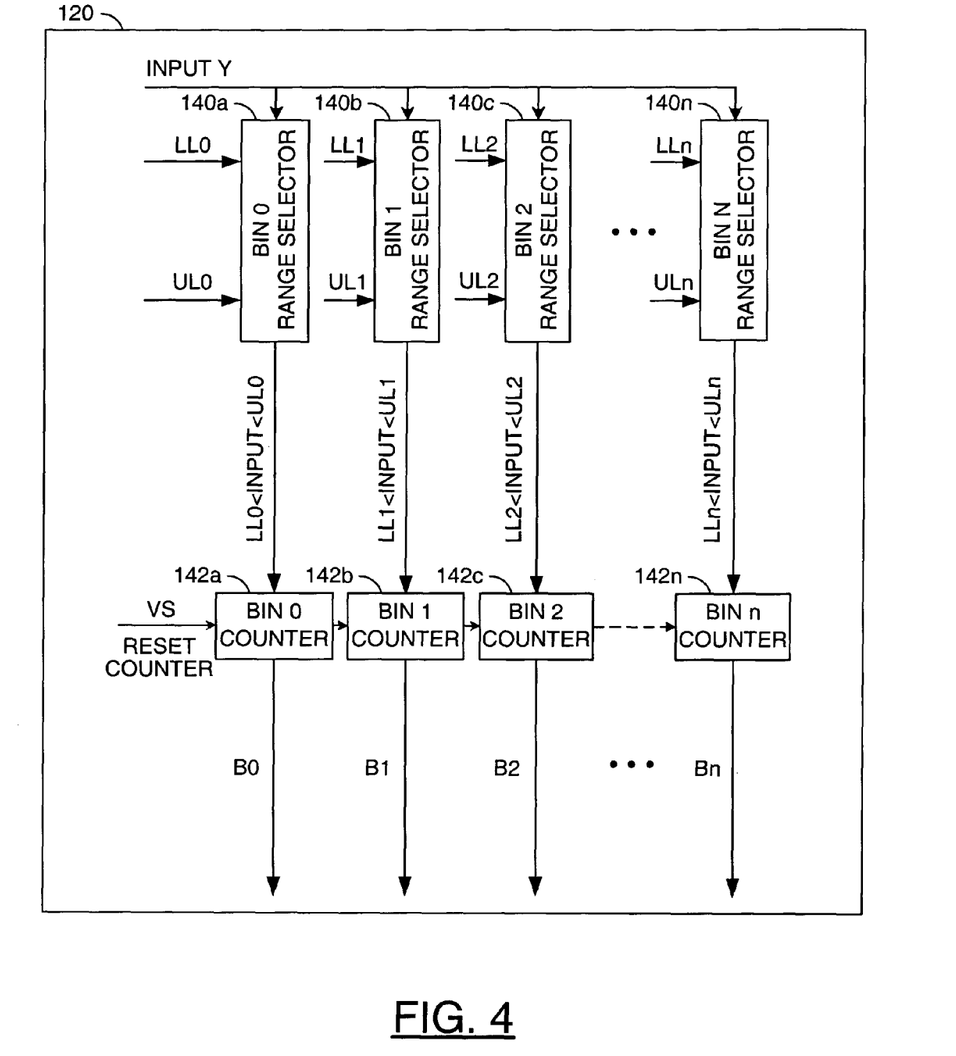
FIG. 4 is a more detailed block diagram illustrating an example of a PLRH block of FIG. 3.

Referring to FIG. 4, a more detailed block diagram is shown illustrating an example of a PLRH generating circuit 120 in accordance with a preferred embodiment of the present invention. In one example, the circuit 120 may comprise a plurality of circuits (or blocks) 140a-140n and a plurality of circuits (or blocks) 142a-142n. The circuits 140a-140n may be implemented, in one example, as range selector circuits. In one example, the circuits 140a-140n may be configured to determine whether an input signal falls within a range between predetermined limits. The circuits 142a-142n may be implemented as counter circuits. In one example, the circuits 142a-142n may comprise 16-bit counter circuits.

Each of the circuits 140a-140n may have a first input that may receive the signal INPUT, a second input that may receive a signal (e.g., LL0-LLn, respectively) and a third input that may receive a signal (e.g., UL0-ULn, respectively). The signals LL0-LLn may be implemented as lower limit values for respective bins (or slots) of the PLRH. The signals UL0-ULn may be implemented as upper limit values for respective bins (or slots) of the PLRH. Each of the circuit 140a-140n may be configured to generate an output indicating when a value of the signal INPUT is within the respective range set by the respective signals LL0-LLn and UL0-ULn.

Each of the circuits 142a-142n may have a first input that may receive an output of a corresponding one of the circuits 140a-140n and a second input that may receive a signal (e.g., VS). In one example, the signal VS may be configured to reset the circuits 142a-142n. In one example, the signal VS may comprise a vertical sync signal of a video stream. Each of the circuits 142a-142n may have an output representing a slot (or bin) value of the perceptual luminance range histogram. For example, the circuit 142a may have an output that may present a signal (e.g., B0) representing a value of a first bin 0. The circuit 142b may have an output that may present a signal (e.g., B1) representing a value for a second bin 1. The circuit 142c may have an output that may present a signal (e.g., B2) representing a value for a third bin 2. The circuit 142n may have an output that may represent a signal (e.g., Bn) representing a value for an nth bin n. The PLRH may provide the energy distribution of the signal INPUT in the form of a histogram of the PLR. The depth and number of bins may be programmable to fit different applications. The output of the circuit 120 may be normalized. The PLRH generally provides a precise way to present the energy distribution of the signal INPUT.

Figure 5:
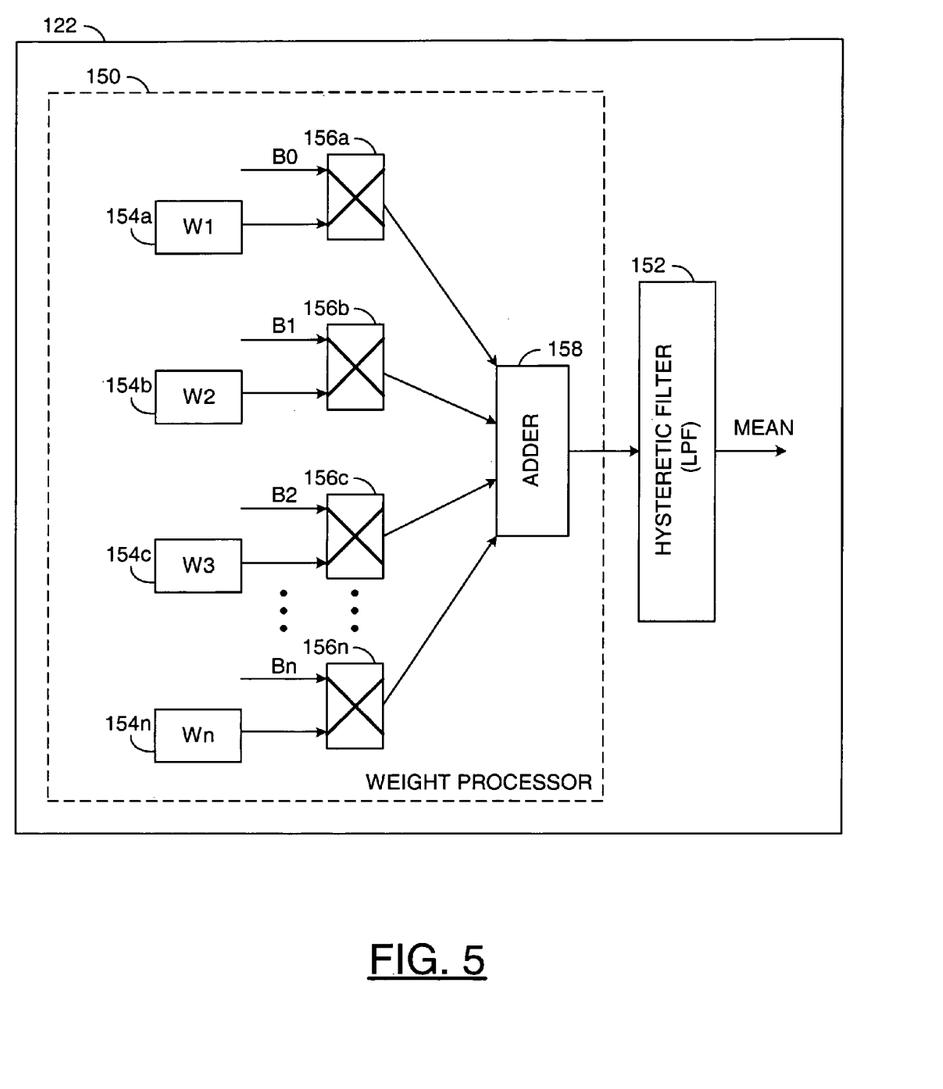
FIG. 5 is a more detailed block diagram illustrating an example of a WPHF block of FIG. 3.

Referring to FIG. 5, a more detailed block diagram is shown illustrating an example of a weight processor and hysteretic filter (WPHF) circuit 122 in accordance with a preferred embodiment of the present invention. In one example, the circuit 122 may comprise a circuit (or block) 150 and a circuit (or block) 152. The circuit 150 may be implemented as a weight processor circuit. The circuit 152 may be implemented as a hysteretic filter circuit. In one example, the circuit 152 may be implemented as a low pass filter (LPF). Each of the signals B0 . . . Bn may be presented to a respective input of the circuit 150. The circuit 150 may have an output that may present a signal to an input of the circuit 152. The circuit 152 may have an output that may present the signal MEAN.

In one example, the circuit 150 may comprise a number of registers 154a-154n, a number of multiplier circuits (or blocks) 156a-156n and an adder circuit (or block) 158. Each of the registers 154a-154n may contain a respective weighting factor or weight (e.g., W0-Wn). Each of the weights W0-Wn may be applied to (e.g., multiplied with) a corresponding one of the signals B0-Bn received from the circuit 120. In one example, each of the weights W0-Wn may be programmable.

Each of the multiplier circuits 156a-156n may have a first input that may receive a respective one or the signals B0-Bn from the circuit 120 and a second input that may receive a respective one of the weights W0-Wn from a corresponding one of the registers 154a-154n. Each of the multiplier circuits 156a-156n may have any output that may present a signal to a corresponding input of the adder circuit 158. The adder circuit 158 may have an output that may present a signal to an input of the hysteretic filter 152.

Figure 6:
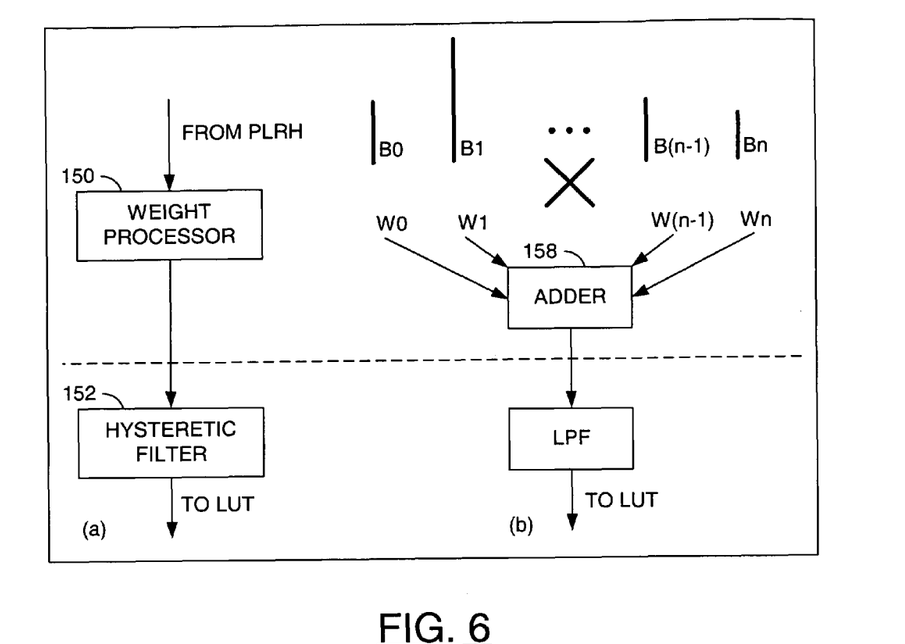
FIG. 6 is a function diagram illustrating an example of a weight processor and hysteretic filter blocks of FIG. 5.

Referring to FIGS. 6(a-b), a function diagram is shown further illustrating an example of the operation of the circuit 122 of FIG. 5. The circuit 122 generally performs a weight processor function 150 and a hysteretic filtering function 152 (illustrated in FIG. 6(a)). The weight processor 150 may be configured to manipulate normalized histogram data by multiplying each of the signals B0-Bn by a respective one of the programmable weight values W0-Wn. The manipulated data (signed) may be summed by the adder 158 and the output of the adder 158 fed into the hysteretic filter 152. The weight processor 150 may be further configured to provide a value or parameter (e.g., μ). In one example, the parameter μ may provide mean-like deviation information that may be used by the LUT 124. In one example, the hysteretic filter 152 may be implemented as a low pass filter (LPF). The LPF may be configured to smooth the accumulated weight and avoid artifacts due to abrupt changes in the PLRH received from the circuit 120.

Figure 7:
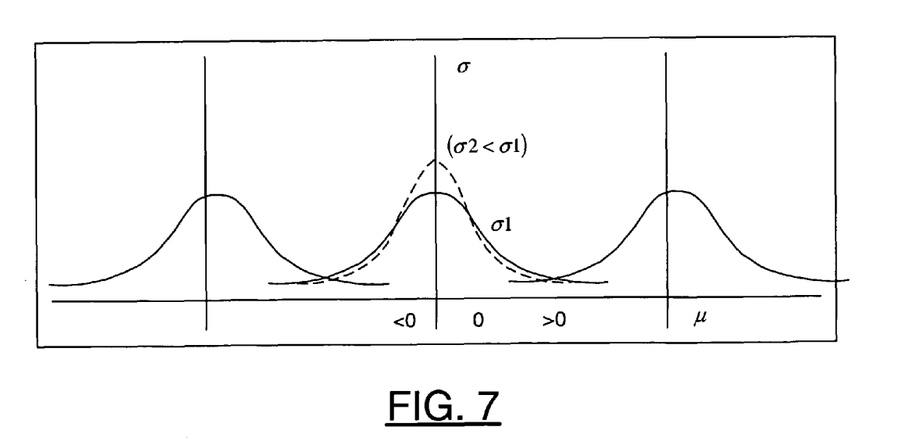
FIG. 7 is a diagram illustrating an example of a Gaussian curve gain distribution in accordance with the present invention.

Referring to FIG. 7, a graph is shown illustrating a Gaussian curve shaped gain distribution in accordance with the present invention. In one example, the LUT 124 may be implemented as a Gaussian curve shaped gain distribution table. The output of the circuit 122 generally provides information for determining a position and a shape of the Gaussian curve gain distribution. For example, the circuit 122 may be configured to provide a parameter (e.g., σ) and the parameter μ. The parameter σ may be used to determine a peak (or center) amplitude of the Gaussian curve gain distribution. For example, the value σ may be used to select among a plurality of predetermined Gaussian curve gain distributions. The parameter μ may be used to determine the position of the center of the Gaussian curve gain distribution. For example, the center of the Gaussian curve may be shifted right when μ>0 and shifted left when μ<0.

In general, the center of the Gaussian curve provides the maximum gain. Since the center of the Gaussian curve provides the maximum gain, the present invention may also provide a kind of luminance equalization effect, without generating color distortion. The feature of dynamic luminance equalization of the PLR is generally based on adaptive parameter selection and the Gaussian curve distribution look-up table (LUT) 124. By selecting different values of σ, a different peak of the Gaussian curve may be obtained. The samples of the Gaussian curve and variations of the parameters μ and σ generally determine the size of the LUT 124.

Figure 8:
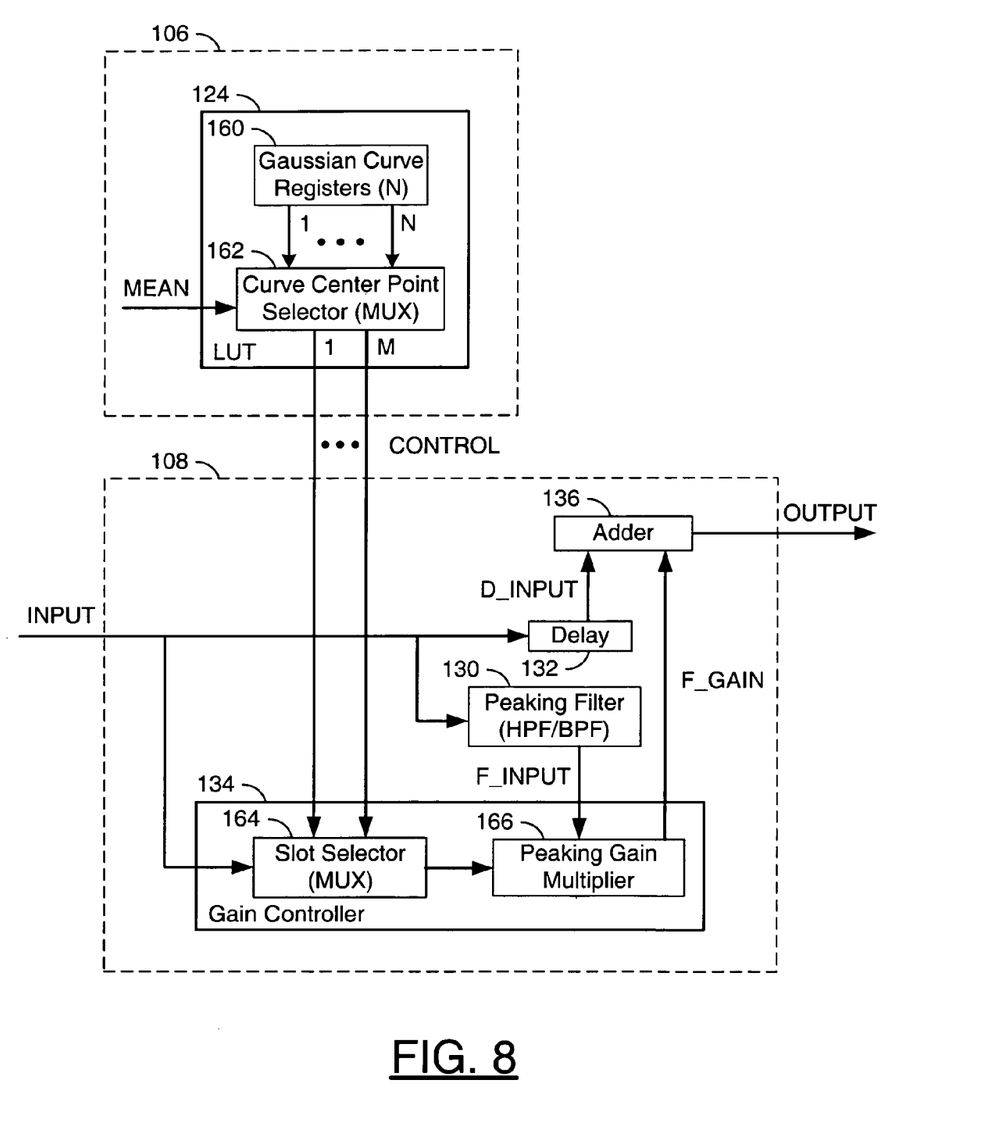
FIG. 8 is a more detailed block diagram illustrating an example of an output circuit of FIG. 3.

Referring to FIG. 8, a more detailed block diagram is shown illustrating an example of an edge enhancement output circuit (or block) 108 and LUT 124 in accordance with a preferred embodiment of the present invention. In one example, the circuit 124 may comprise a circuit (or block) 160 and a circuit (or block) 162. The circuit 160 may comprise a number (e.g., an integer N) of Gaussian curve registers. The circuit 162 may comprise a selector (or multiplexer) circuit. In one example, the circuit 162 may be configured to select a center point of a gain curve. For example, the circuit 162 may be configured to select a number (e.g., an integer M) of values from the number of Gaussian curve registers 160. The selected values may be presented to the circuit 108 as the signal CONTROL. In one example, the integer M may be less than the integer N.

The circuit 134 may comprise a circuit (or block) 164 and a circuit (or block) 166. The circuit 164 may be implemented as a slot selector (or multiplexer) circuit. The circuit 166 may be implemented as a peaking gain multiplier circuit. The circuit 164 may have a number (e.g., M) of first inputs, corresponding to the outputs of the circuit 124, that may receive the signal CONTROL.

The circuit 164 may have a second input that may receive the signal INPUT and an output that may present a signal to first input of the circuit 166. The circuit 166 may have a second input that may receive the signal F_INPUT and an output that may present the signal F_GAIN. The circuit 166 may be configured to generate the signal F_GAIN in response to the signal F_INPUT and the output of the circuit 164.

Figure 9:
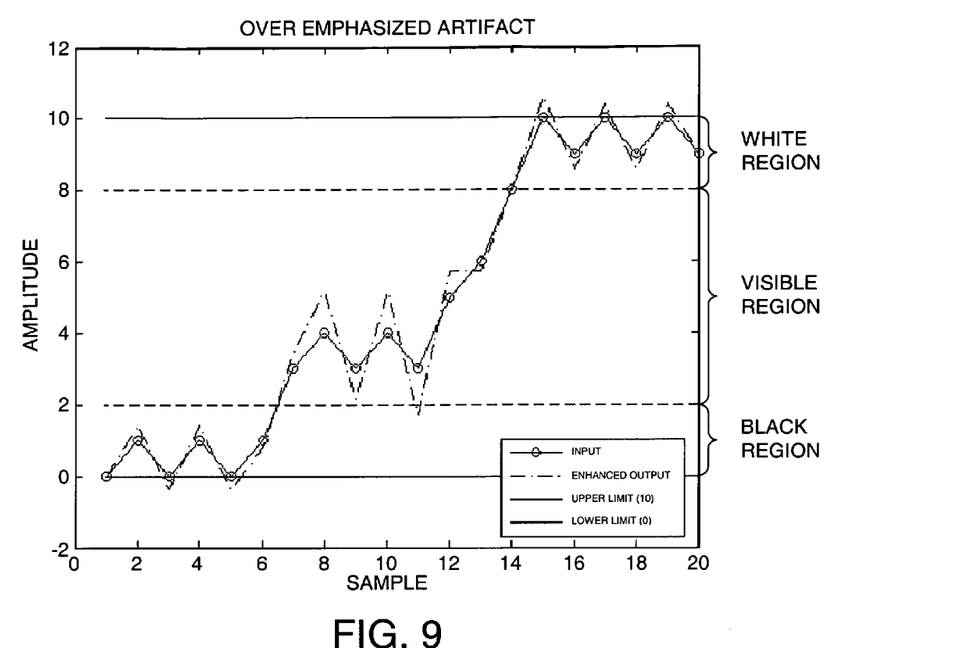
FIG. 9 is a graph illustrating an example of an enhanced version of the input signal of FIG. 1 obtained using an enhancement technique in accordance with the present invention.

Referring to FIG. 9, a graph is shown illustrating enhancement using a technique in accordance with the present invention. In general, the settings and definitions, such as black and white range, HPF coefficients and input signal used to generate the enhanced output signal illustrated in FIG. 9 are the same as used in FIG. 1. In general, the present invention provides better quality enhancement than conventional techniques. The artifacts shown in FIG. 1 are reduced or eliminated and may be ignored. The present invention generally does not scarify the enhancement in the PLR. For example, the present invention generally avoids shifting a sample from the white region (e.g., having a value greater than 8 to 10) into the PLR (e.g., values ranging from 2 to 8) which produces an artifact (noise) that looks like a grey scratch on a white board.

The artifacts shown in FIG. 1 can be amplified by an interpolation processes, such as de-interlacing and horizontal or vertical scaling. Since the present invention may avoid generation of the artifacts and enhance the sharpness of an input signal, the present invention may be useful for iDTV and HDTV applications.

Figure 10:
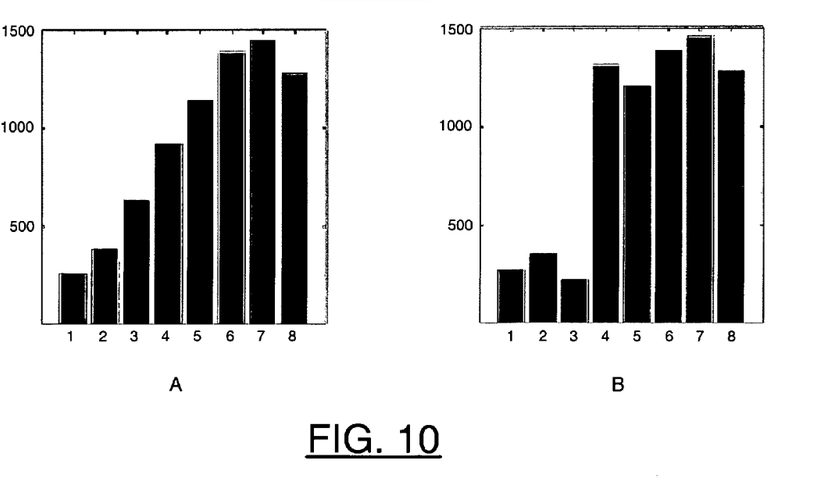

Referring to FIGS. 10(a-b), histograms are shown illustrating an example of dynamic contrast in accordance with a preferred embodiment of the present invention. FIG. 10a generally illustrates the original histogram of the signal INPUT. FIG. 10b generally illustrates a normalized histogram generated in accordance with the present invention. The histogram of FIG. 10b generally has a more even energy distribution than the histogram of FIG. 10a. Although the present invention generally does not equalize the PLR, the present invention generally has an advantage of not causing chrominance distortion (artifacts) because the invention may apply, in one example, a finite impulse response (FIR) filter gain based upon a Gaussian curve. The center of the Gaussian curve is generally determined based upon the perceptual luminance range histogram. By applying a filter gain based upon a Gaussian curve centered according to the perceptual luminance range histogram equalization may be achieved.

The present invention generally provides advantages over conventional enhancement techniques that may include, but are not limited to, (i) providing a filtering gain that emphasizes only pixels in the PLR, (ii) reducing over emphasized artifacts using adaptive gain control, (iii) providing a PLRH describing an energy distribution of the PLR that can be used to set reference limits to avoid the artifacts, (iv) providing a hysteretic filter that may reduce a "breath scream" artifact that may be caused by abrupt histogram changes, (v) providing a LUT, or similar device, that may be configured to adaptively control the filtering gain to achieve a sharper result for different applications, (vi) providing a Gaussian curve gain distribution built into a LUT and adjusted to adaptively achieve luminance equalization without color distortion, and/or (vii) providing a peaking gain that may be varied by simply modifying the shape of the Gaussian curve in the LUT.

The functions illustrated by the diagram of FIGS. 3-8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to determine frequency of occurrence information for only a perceptual luminance range of gray levels from luminance data of an input signal, wherein (i) said input signal comprises a range of gray levels ranging from a minimum gray level value to a maximum gray level value, (ii) said perceptual luminance range of gray levels represents a visible region of said input signal ranging from a first predetermined gray level value to a second predetermined gray level value, (iii) a second range of gray levels that represents a black region of said input signal ranges from said minimum gray level value to said first predetermined gray level value, and (iv) a third range of gray levels that represents a white region of said input signal ranges from said maximum gray level value to said second predetermined gray level value; and
    a second circuit configured to selectively adjust one or more values for at least one portion of the luminance data of said input signal corresponding to the gray levels within the perceptual luminance range of grey levels based upon said frequency of occurrence information, wherein a gain of said second circuit is controlled based upon said frequency of occurrence information.

2. The apparatus according to claim 1, wherein said first circuit comprises:
    a perceptual luminance range histogram generation circuit configured to generate perceptual luminance range histogram data in response to luminance data of said input signal within said perceptual luminance range of gray levels;
    a processing and filter circuit configured to generate a control signal in response to said perceptual luminance range histogram data; and
    a look-up table configured to generate data for controlling said gain of said second circuit in response to said control signal, said look up table containing data representing samples of one or more Gaussian curves.

3. The apparatus according to claim 2, wherein said perceptual luminance range histogram generation circuit comprises a plurality of counters configured to count occurrences of predetermined luminance values in the perceptual luminance range of gray levels of said input signal.

4. The apparatus according to claim 2, wherein said processing and filter circuit comprises:
    a multiplier circuit configured to generate weighted histogram data by applying a plurality of weighting factors to said perceptual luminance range histogram data;
    an adder circuit configured to sum said weighted histogram data; and
    a filter circuit configured to smooth an accumulated weight value calculated from the summed weighted histogram data.

5. The apparatus according to claim 4, wherein said weighting factors are programmable.

6. The apparatus according to claim 4, wherein said filter circuit comprises a hysteretic filter configured to minimize rapid changes in said perceptual luminance range histogram data.

7. The apparatus according to claim 4, wherein said filter circuit comprises a low pass filter configured to minimize rapid changes in said perceptual luminance range histogram data.

8. The apparatus according to claim 1, wherein said first circuit is further configured to adaptively control filtering gain of said second circuit according to a Gaussian curve gain distribution stored in a look-up table.

9. The apparatus according to claim 8, wherein a center of said Gaussian curve gain distribution is determined by a mean value of said frequency of occurrence information for said perceptual luminance range of the gray levels of said input signal.

10. An apparatus comprising:
means for determining frequency of occurrence information for only a perceptual luminance range of gray levels from luminance data of an input signal, wherein said input signal comprises (i) a range of gray levels ranging from a minimum gray level value to a maximum gray level value, (ii) said perceptual luminance range of gray levels represents a visible region of said input signal ranging from a first predetermined gray level value to a second predetermined gray level value, (iii) a second range of gray levels that represents a black region of said input signal ranges from said minimum gray level value to said first predetermined gray level value, and (iv) a third range of gray levels that represents a white region of said input signal ranges from said maximum gray level value to said second predetermined gray level value; and
means for selectively adjusting one or more values for at least one portion of the luminance data of said input signal corresponding to the gray levels within the perceptual luminance range of grey levels based upon said frequency of occurrence information, wherein a gain of said selectively adjusting means is controlled based upon said frequency of occurrence information.

11. A method for controlling video enhancement gain in a video image, comprising the steps of:
determining frequency of occurrence information for only a perceptual luminance range of gray levels from luminance data of an input signal using a number of counters, wherein said input signal comprises (i) a range of gray levels ranging from a minimum gray level value to a maximum gray level value, (ii) said perceptual luminance range of gray levels represents a visible region of said input signal ranging from a first predetermined gray level value to a second predetermined gray level value, (iii) a second range of gray levels that represents a black region of said input signal ranges from said minimum gray level value to said first predetermined gray level value, and (iv) a third range of gray levels that represents a white region of said input signal ranges from said maximum gray level value to said second predetermined gray level value; and
selectively adjusting one or more values for at least one portion of the luminance data of said input signal corresponding to the gray levels within the perceptual luminance range of grey levels based upon said frequency of occurrence information using an adaptive video enhancement gain control to control a gain in said video image.

12. The method according to claim 11, further comprising the steps of:
generating perceptual luminance range histogram data for said perceptual luminance range of gray levels of said video image;
generating weighted histogram data from said perceptual luminance range histogram data and a plurality of predetermined weights;
generating filtered weighted histogram data from said weighted histogram data;
controlling said gain in response to said filtered weighted histogram data.

13. The method according to claim 12, wherein said predetermine weights are programmable.

14. The method according to claim 12, further comprising the steps of:
summing said weighted histogram data; and
smoothing an accumulated weight value calculated from the summed weighted histogram data.

15. The method according to claim 11, wherein the step of selectively increasing enhancement comprises adaptively controlling filtering gain according to gain distribution data stored in a look-up table, wherein said gain distribution data represents samples of one or more Gaussian curves.

16. The method according to claim 15, wherein said gain distribution data is determined for a particular application.

17. The method according to claim 14, further comprising the step of:
hysteretically filtering the summed weighted histogram data to minimize effects of rapid time shifts in said video image.

18. The method according to claim 15, wherein the Gaussian curve gain distribution provides dynamic luminance equalization of the perceptual luminance range and avoids generating color distortion.

19. The apparatus according to claim 8, wherein the Gaussian curve gain distribution provides dynamic luminance equalization of the perceptual luminance range and avoids generating color distortion.

20. The apparatus according to claim 1, wherein said second circuit is further configured to reduce or eliminate shifting of samples from the white region or the black region into the visible region.

21. The apparatus according to claim 1, wherein the gray levels of said perceptual luminance range are between the second range of gray levels of the black region and the third range of gray levels of the white region.

22. The apparatus according to claim 1, wherein the second range of gray levels representing the black region comprises two or more gray levels.

23. The apparatus according to claim 1, wherein the third range of gray levels representing the white region comprises two or more gray levels.

* * * * *